No. 753,407. Patented March 1, 1904.

UNITED STATES PATENT OFFICE.

WILLIAM LENDEROTH, OF NEW YORK, N. Y.

COMPOSITION OF MATTER.

SPECIFICATION forming part of Letters Patent No. 753,407, dated March 1, 1904.

Application filed June 15, 1903. Serial No. 161,526. (No specimens.)

*To all whom it may concern:*

Be it known that I, WILLIAM LENDEROTH, a citizen of the United States, residing in the city of New York, Stapleton, borough of Richmond, and State of New York, have invented a new and useful composition of matter which can be utilized in various ways—as, for example, for making blocks, bricks, tiles, or the like or forming hollow pipe-like or other objects—of which the following is a specification.

The invention consists in mixing red shale and serpentine rock and treating this mixture so as to produce a hard homogeneous mass, which latter can be given a required shape. The red shale which has been successfully employed is what is known and described as "triasoic red shale" and is found in the palisade region extending along the coast of the Atlantic ocean. An analysis of this shale which has been used shows the following proportion, viz: silica, from forty to fifty per cent.; alumina, from fifteen to twenty per cent.; iron oxid, from ten to sixteen per cent.; lime, from three to six per cent. The serpentine rock which has been used is found on Staten Island, New York, New Jersey, also in large quantities in Baltimore and other places in Maryland and other States. The analysis of the serpentine rock which has been used shows the following proportion, viz: silica, from thirty-six to forty-three per cent.; magnesia, from twenty-nine to thirty-seven per cent.; alumina, one per cent.; iron oxid, one to one and a half per cent.; lime from five to nine per cent.

In carrying out this invention the shale and serpentine rock are broken, crushed, or more or less finely ground. The proportion of admixture which I have found convenient is seventy-eight per cent. of red shale and twenty-two per cent. of serpentine rock; but this proportion may be varied, as the percentage of the iron oxid in the shale and the percentage of magnesia in the serpentine rock varies. The mixture of the shale and serpentine rock is then heated to the melting-point. When thoroughly melted, it can be run into molds of suitable size or shapes and pressed and treated in the same manner as molten glass. A satisfactory result has been obtained by melting the mixture in a crucible. The ordinary brass furnace was used. About one hour was found sufficient for thoroughly melting the substance. The melted substance was then allowed to harden. The melted substance can be run or transported into a mold of any desired shape, so that the final product is in the form of a slab, tile, brick, pipe, or other configuration.

The product can be treated like glass, annealed and allowed to harden, as in the case of glass.

In place of a brass furnace any suitable furnace or heating device will answer. Mention can be made, for example, of glass-melting furnaces or cupola-furnaces as being suitable.

The substance or composition of matter obtained by the above process is found to be hard and homogeneous. It can be used for paving or building blocks, roofing, or other tiles, also tubes for insulation for electric work and elsewhere. The color is generally dark brown to black, in most cases approaching nearly to if not entirely black.

The composition of matter can be used as pavement on sidewalks or streets. It has also been found to resist the action of acids and alkalies.

What I claim, and desire to secure by Letters Patent, is—

1. As a new article of manufacture a hard homogeneous molded fused mass or composition of matter composed of shale and serpentine rock, which can be produced by melting said ingredients by heat and then molding the same into required shape.

2. The process of producing blocks and other articles from the composition of shale and serpentine rock, which consists in heating the mixture of shale and serpentine rock to the melting or fusing point and then molding the same.

WILLIAM LENDEROTH.

In presence of—
GEO. U. SLAKE,
C. F. WARTH.